Oct. 1, 1963 W. B. KIDDER 3,105,952
PRESSURE DETECTING METHOD AND APPARATUS
Filed Aug. 4, 1960 2 Sheets-Sheet 2

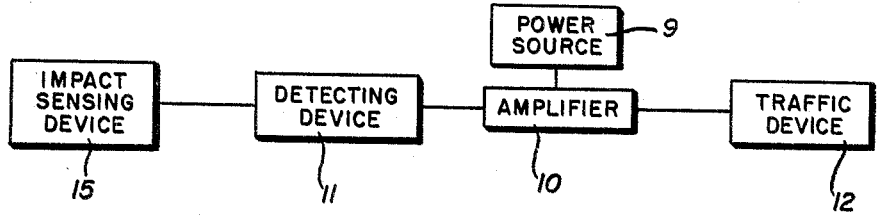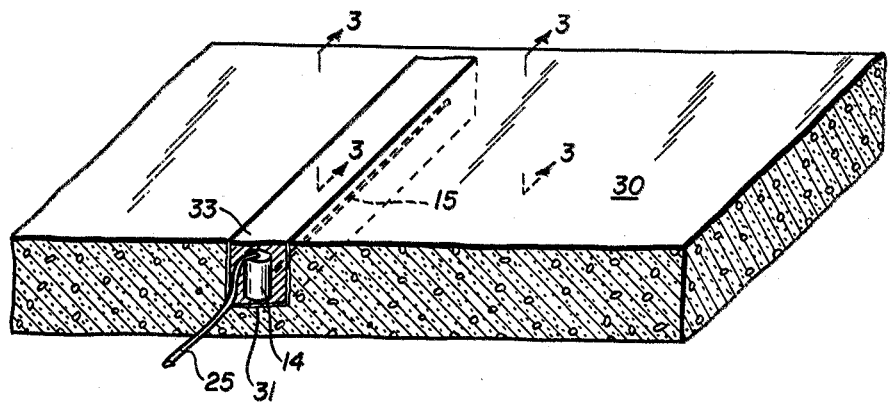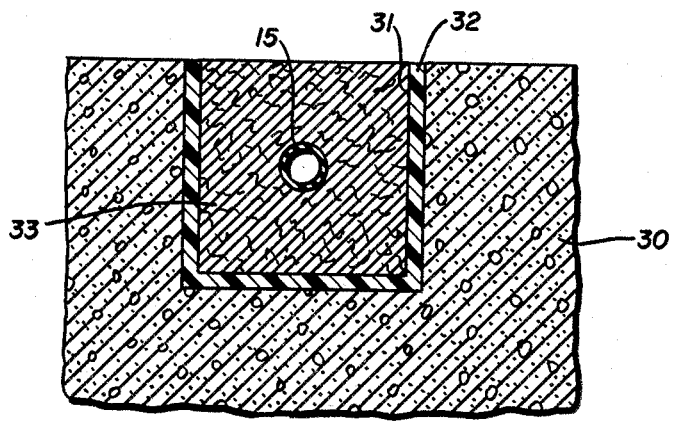

INVENTOR.
Warren Benjamin Kidder
BY
McGrew and Edwards
ATTORNEYS

United States Patent Office 3,105,952
Patented Oct. 1, 1963

3,105,952
PRESSURE DETECTING METHOD AND APPARATUS
Warren Benjamin Kidder, 1485 Boston St., Denver, Colo.
Filed Aug. 4, 1960, Ser. No. 46,652
7 Claims. (Cl. 340—38)

This invention relates to highly sensitive detection method and apparatus and the method of use for such as vehicle detection.

It has been the desideratum of the prior art to provide highly sensitive detection means for traffic control, traffic density surveys, highway counting operations, toll collection counters and the like. Furthermore, it has been the desire to provide an integrated detecting system and method of use therefor which can be used in such places as bridge and tunnel approaches and similar places where bed preparation for the reception of detecting equipment normally prohibits the use of the same type of apparatus as used in the above previously noted operations.

My invention provides an extremely simple, compact and inexpensive apparatus which is easily installed and used for all of the above noted operations. Furthermore, my apparatus is so simple and inexpensive that its use for the operation of parking gates, garage doors and the like is within the means of the average person.

With use of the invention, extensive excavation for installation is not required. Lengthy detours and barricades across roads or highways while the devices are being installed are not necessary because of the speed with which the installation may be accomplished. The invention provides a detector which is completely accurate under extreme weather conditions, regardless of snow, ice, intense heat, traffic conditions, and regardless of the speed of the vehicles. Furthermore, my apparatus is not affected by parked, standing or stalled vehicles which may be positioned on the sensing unit.

Because of its resistance to wide variations in weather, its weatherproofness and ruggedness, maintenance costs are extremely low.

Repaving of roads or other areas in which my device is incorporated may be accomplished without disturbing the original installation. Furthermore, because of the unique method of installation, the apparatus is not damaged by heavy snow removal equipment and the like.

Previous commercially available devices for vehicular traffic detection and counting required extensive preparation of the roadbed before installation. They have necessitated removal of comparatively large sections of the roadway with preparation of a bed beneath the surface. Heavy and cumbersome steel bracing which sometimes weigh upwards of 500 pounds had to be relatively permanently positioned in the above described slot as by setting in concrete or the like. The sensing mechanism of the former systems have likewise been heavy and cumbersome devices which were relatively integrally attached to the above steel base. Normally, they protruded above the surface of the surrounding roadway, thereby frequently becoming damaged by large vehicles, snow removal equipment and the like. The installation thereof was comparatively expensive and required lengthy barricading and closing of roadways in which they were being installed. Because of their bulkiness and size, installation in bridge and tunnel approaches has been extremely unattractive.

From the above discussion of the features and advantages of my invention, it becomes readily apparent that many of the difficulties encountered with the detecting apparatus of the prior art have been overcome.

Briefly, my invention is comprised of an extremely sensitive detecting device which is interconnected with a suitable amplifying device. Elongated sensing means are interconnected with the detecting device. In my preferred arrangement, the foregoing consists of an elongated flexible tube which is suitably associated with a small single button carbon microphone. The microphone is connected to a suitable amplifier which produces command signals for actuating equipment or devices with which it is connected. The microphone and amplifier are of such design that extremely small impact disturbances of the tubular sensing element produce a signal voltage in the carbon microphone by changing the effective density of the carbon particles therein. This change in electrical resistance produces the foregoing mentioned signal to the amplifier.

The above apparatus is installed in a slot cut in the road surface or the like and which may be as small as 1½ inches wide by 1 inch deep by about 8 feet long. Such a slot is suitably cleaned and prepared in a manner which will be described hereinafter. Thereafter, an elasto-plastic material is used to imbed the sensing element slightly below the surface of the roadway in the slot for operation.

It is thus among the objects and advantages of my invention to provide a simple method, and inexpensive and compact apparatus for exceptionally accurate pressure detection; which apparatus is easily and economically installed; which is accurate under extreme weather conditions; which remains unaffected by parked, standing or stalled vehicles when used in traffic control operations; which is not damaged by snow removal equipment and the like; and the use of which permits repaving and repair of roadways and the like without the necessity of disturbing the original installation.

Many other advantageous aspects and features of my invention will become readily apparent to those skilled in the art from a study of the hereinafter set forth description of the appended exemplary drawings. In these drawings:

FIG. 1 is a block diagram schematically indicating one manner of practicing and using my invention;

FIG. 2 is an enlarged isometric view in partial section of the preferred method of installation;

FIG. 3 is an enlarged sectional view taken along line 3—3 of FIG. 2;

Before describing the drawings in detail, I wish it understood that they are merely exemplary of a manner of practicing my invention and I do not desire to be limited thereby, but rather by the scope of the hereafter appended claims.

Figure 4:
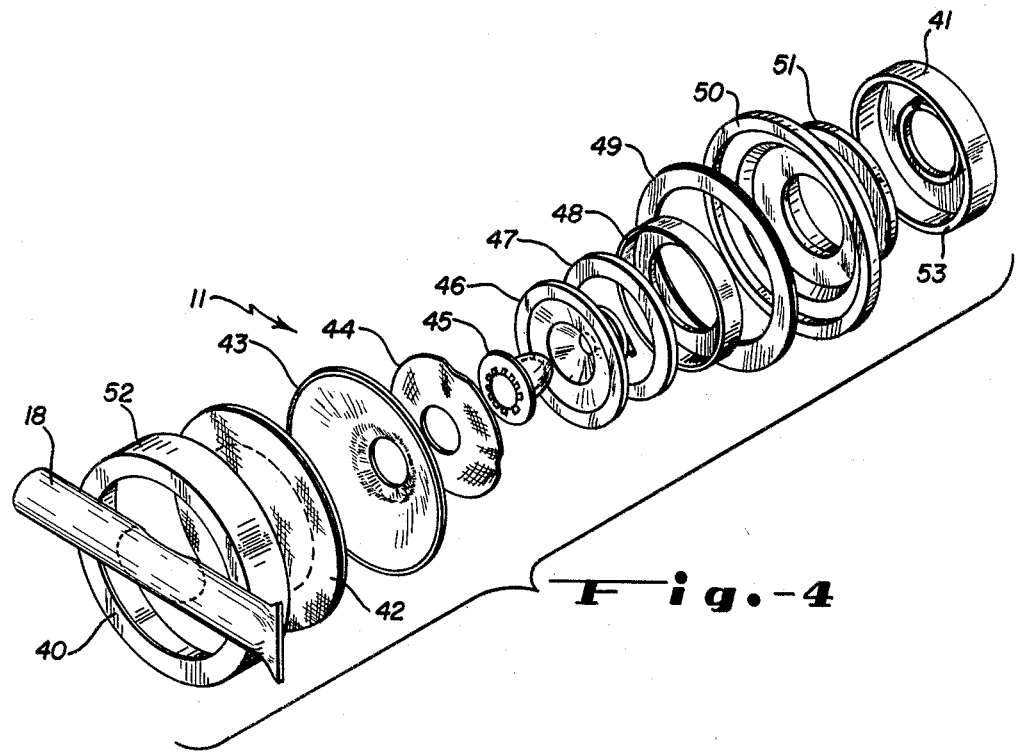
FIG. 4 is an exploded view of a detecting device usable in practicing my invention.

Apparatus by which my invention may be practiced may consist of a sensitive amplifying means 10 connected to a detecting device 11 and adapted to receive minute signals therefrom and amplify them for operating traffic devices or the like 12. A suitable power source 9 is connected to the amplifier 10 for operation. The detecting device 11 is preferably a single button carbon microphone and is comprised essentially (FIG. 4) of a casing including an enlarged annular upper portion 40 having secured thereto transmitter 18, and a smaller annular base portion 41 having sandwiched therebetween a flexible moistureproof outer diaphragm 42; a thin sheet metallic horn 43; a metallic inner gauze diaphragm 44; a closed cup 45 containing carbon particles; a retaining ring 46; an insulating washer 47; an inner retaining washer 48; multiple insulation washer 49; an outer retaining ring 50; and another insulation washer 51. When the sandwich is assembled, the lower peripheral edge 52 of the upper base portion 40 is crimped over the upper peripheral edge 53 of the lower base portion to maintain the assembly as the integral detecting device 11.

Figure 5:
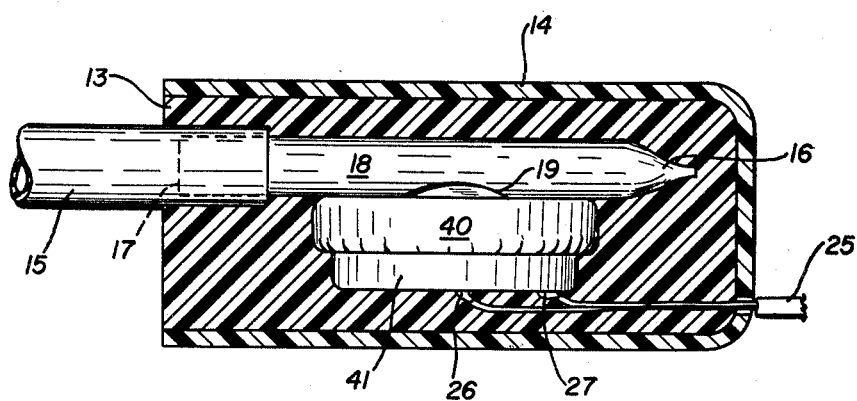
FIG. 5 is a perspective view of the device of FIG. 3 as assembled for installation.

The amplifying means 10 is preferably a sensitive audio amplifier. The detecting device 11 is preferably sealed in a waterproof heat and cold resistant plastic material 13 (FIG. 5) within the plastic sheath 14. The impact sensing element 15 is preferably an elongated flexible tubular member having a cap (not shown) at one end thereof for preventing dirt and other foreign matter from entering the device. The tubular member 15 is operatively interconnected with the detecting device 11 by positioning it on the extension portion 17 of the tubular transmitter member 18. The transmitter member 18 is preferably a short length of metal tubing, such as copper, which is open at one end for attachment to the tubular member and clamped at the other end 16 to seal out dirt, foreign matter and the like. Intermediate the ends of the transmitter 18, substantially at the center thereof, is a cavity 19 which is positioned on the upper casing 40 of the detector button and held in position as by soldering or the like. A lead wire 25 which is connected to the carbon button 11 at terminals 26 and 27 also as by soldering or the like, passes out through the opposite end of the sheath 14 for suitable connection with the amplifier.

In operation, the sensing member 15 is positioned in the roadway in a manner which will be described in detail hereafter. Vehicular traffic and the like passing over and in operative contact with the sensing member cause an impact signal to be generated and carried therethrough to the detecting device 11. The thus physically generated signal in the member 15 causes a disturbance impulse in the transmitter 18 which in turn causes a disturbance of the carbon particles in cup 45 thereby changing the effective resistance of the electrical system to which the button is connected. This generates an activating signal which is passed to the amplifier 10 where it is amplified to operate the mechanism 12 with which it is associated.

The preparation of a roadway or the like and installation of the above-described equipment is important. Briefly, the roadway is prepared by cutting a slot approximately to the dimensions of 1½ inches in width, 1 inch depth and about 8 feet in length (see FIG. 2). The cutting may be accomplished by a concrete saw or the like. Normally, with the use of such cutting instruments, water or other lubricating fluids are used to control heat generated by the cutting. All superfluous moisture or lubricant, and all loose particles, dirt and the like are removed from the slot. A slot so prepared is generally indicated in a roadway 30 by reference character 31. After the foregoing preparation, a thin layer of a primer compound 32 (FIG. 3) is applied to all exposed surfaces of the slot to fill cracks, pores and the like. Additional primer is applied to the adjacent surface of the roadway near the edges of the slot. My primer is a sealing adhesive and may be any one of those commercially available which will serve the above-mentioned functions. Next, a composition is prepared which is preferably referred to as a detector compound and is indicated by reference character 33. In its initial condition, the detector compound is a relatively viscous fluid-like material which may be poured into the slot 31, and is essentially an elasto-plastic material which has the characteristics of a semi-hard rubber when set. It is shipped and stored in a partially polymerized condition so that it may be stored for a period of time without losing its flowable characteristics. In use, the fluid elasto-plastic is mixed with a suitable catalyst to catalytically complete the polymerization within a period of two to four hours under proper temperature conditions to yield a semi-hard form.

After the detector compound has been mixed with the catalyst, as described above, it is poured into the slot to fill it to approximately one-half of its depth. The compound is then worked to assure there are no cracks, voids or air spaces between the slot and the compound. The sensing device and the plastic sheath, including the detecting device, are then positioned in the roadway in the previously placed detector compound. The remainder of the slot is then filled with the detector compound which is also worked to assure that no voids or air spaces remain. After about two to four hours, the foregoing will be ready for vehicular traffic to pass thereover.

Summarizing the method of installation, it consists of preparing a slot of the above-mentioned dimensions in a roadway. The slot is thoroughly cleaned and all moisture removed. A primer (which serves as a sealant) is then applied to all surfaces which may come in contact with the detector compound. The prepared detector compound is poured into the slot and the sensing device embedded therein. In this regard, it is the preferred embodiment that the detector be added in two layers substantially as above-described, although it is within the purview of my inventive concept to apply the compound and place the sensing unit relatively simultaneously since in either case an integral mass results upon aging. The compound so placed in the slot is also preferably worked to assure removal of all voids, air spaces and the like.

When it is anticipated that detectors according to this invention are to be included in roads under construction or to be constructed, the preferred method of forming the slot is to place a form in the roadway during the surfacing thereof. After the curing of the roadway, the form (which may be such as a wooden plank or the like) is removed, leaving a preformed slot in the roadway.

Although I prefer to use the flexible rubber tubular sensing device discussed above, it has been found that other sensing means work equally as well. An elongated metal tube or strip or other materials capable of transmitting impact impulses are also usable. Furthermore, other types of detectors, amplifying means and detector compounds than those specifically described hereinbefore are usable, providing they have the necessary operational functions and characteristics hereinbefore described in order for the apparatus to properly function.

Also, with some detector materials it is anticipated that extensive cleaning will be unnecessary and the slot may be a depression of lesser dimensions than those expressed above, in my preferred installation.

Having described my invention in sufficient detail and clarity to enable those skilled in the art to practice it, what I desire to have protected by Letters Patent is set forth in the following claims.

I claim:

1. The method of installing a sensing element of a vehicle detecting device in a hard surfaced roadway or the like, which comprises forming a channel-like slot in the surface of the roadway, forming in situ in said slot an elastic and impulse transmitting body for the sensing element by pouring a material into the slot, said material having the characteristic of setting as a semi-hard elastic mass, embedding an elongated sensing element in the material so as to be below the top surface thereof, and allowing said material to set as a semi-hard elastic mass in said slot to retain said sensing element in position therein.

2. The method of installing a sensing element of a vehicle detecting device in a hard surfaced roadway or the like, which comprises forming a channel-like slot in the surface of the roadway, sealing the walls of said slot with an adhesive, forming in situ in said slot an elastic and impulse transmitting body for the sensing element by pouring a material into the slot, said material having the characteristic of setting as a semi-hard elastic mass, embedding an elongated sensing element in the material so as to be below the top surface thereof, and allowing said mixture to set as a semi-hard elastic mass bonded by said adhesive in said slot to thereby retain said sensing element in position therein.

3. The method of installing a sensing element of a vehicle detecting device in a hard surfaced roadway or the like, which comprises forming a channel-like slot in the surface of the roadway, forming in situ in said slot an elastic and impulse transmitting body for the sensing element by pouring a liquid material into the slot, said liquid material having the characteristic of setting into a semi-hard elasto-plastic mass, embedding an elongated sensing element in the material so as to be below the top surface thereof, allowing the liquid material to set as an elasto-plastic in said slot to retain said sensing element in position therein.

4. The method of installing the sensing element of a vehicle detecting device in a hardened surface roadway which comprises forming an open channel-like slot in the roadway, providing a quantity of viscous and liquid elasto-plastic material in said slot, adding a catalyst to said material, adding a sufficient quantity of the material into the slot to fill the same to a required level, suspending the sensing element of a vehicle detecting device in the material in the slot in spaced relationship to the walls of the slot, and allowing the material to set as a semi-hard mass and retain the element in its suspended position.

5. The method of installing the sensing element of a vehicle detecting device in a hardened surface roadway which comprises forming an open channel-like slot in the roadway, sealing the walls of the slot with a primer-adhesive, providing a quantity of viscous elasto-plastic material, adding a catalyst to said material, adding a sufficient quantity of the material into the slot to fill the same to a required level, suspending the sensing element of a detecting device in the material in spaced relationship to the walls of the slot, and allowing the material to set as a semi-hard mass and retain the element in its suspended position.

6. In a device for detecting the passage of road vehicles thereover, the improvement which comprises a channel-like slot formed in a hard surfaced roadway, an elongated vehicle sensing element in said slot for producing impulse signals upon passage of a vehicle thereover, a body of elasto-plastic material formed in situ in said slot embedding said element and holding the same in spaced relation to the walls of said slot, means for sealing said material to the walls of said slot, and means for connecting said element to a signal utilizing device.

7. In a device for detecting the passage of road vehicles thereover, the improvement which comprises a channel-like slot having essentially vertical side walls formed in a hard surface road, an elongated vehicle sensing element in said slot for producing impulse signals upon passage of a vehicle thereover, a body of elasto-plastic material formed in situ in said slot embedded said element and holding the same in spaced relation to said side walls of said slot, means for substantially bonding said material to the walls of said slot, and means for connecting said element to a signal utilizing device.

References Cited in the file of this patent

UNITED STATES PATENTS 2,276,837     Greentree _____ Mar. 17, 1942

FOREIGN PATENTS 615,554     Germany _____ June 13, 1935